S. B. WINN.
TRAILER ATTACHMENT FOR VEHICLES.
APPLICATION FILED AUG. 11, 1917.
1,249,705.  Patented Dec. 11, 1917.
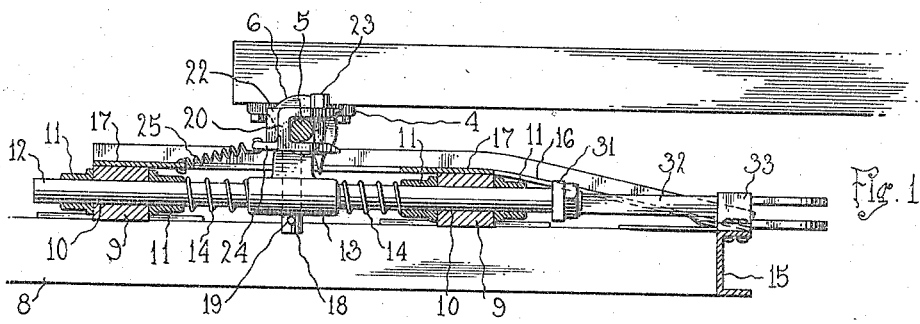
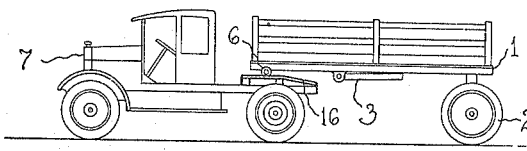
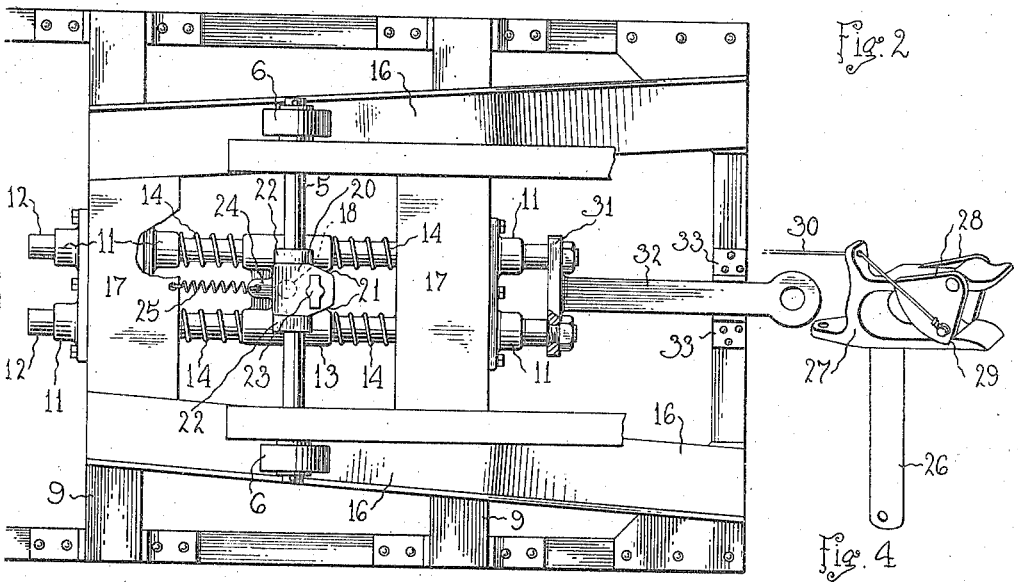

UNITED STATES PATENT OFFICE.

SIDNEY B. WINN, OF LAPEER, MICHIGAN, ASSIGNOR TO LAPEER TRACTOR-TRUCK COMPANY, OF LAPEER, MICHIGAN, A CORPORATION OF MICHIGAN.

TRAILER ATTACHMENT FOR VEHICLES.

1,249,705.          Specification of Letters Patent.     Patented Dec. 11, 1917.

Application filed August 11, 1917. Serial No. 185,662.

*To all whom it may concern:*

Be it known that I, SIDNEY B. WINN, a citizen of the United States of America, residing at Lapeer, in the county of Lapeer and State of Michigan, have invented certain new and useful Improvements in Trailer Attachments for Vehicles, of which the following is a specification, reference being had therein to the accompanying drawings.

This invention relates to a trailer attachment for vehicles and has special reference to a novel device for coupling a trailer to a tractor, truck or self propelled vehicle.

The primary object of my invention is to furnish a novel yieldable coupling device by which a two-wheeled trailer can be easily and quickly coupled to a three or four wheel tractor, so as to provide a five or six wheel vehicle with a fifth wheel or pivotal movement between the trailer and the tractor, so that the trailer can be readily moved irrespective of its length relatively to the tractor.

Another object of my invention is to provide a trailer attachment for tractors which may be supported independently of a tractor, particularly when loading or unloading, thus permitting of the tractor being used for other purposes. The tractor is designed so that it may be easily and quickly pushed under the trailer and coupled thereto, and provision is made so that the trailer attachment will have a yieldable connection with the tractor to avoid unnecessary stresses and strains and permit of the tractor moving a heavy load.

A further object of my invention is to provide a draft appliance between parts of a six wheel vehicle that can be easily and quickly installed, the appliance consisting of strong and durable parts that are easy to assemble relatively to the body or frame of an ordinary tractor.

The above and other objects are attained by a mechanical construction that will be hereinafter described and then claimed, and reference will now be had to the drawings, wherein—

Figure 1 is a longitudinal sectional view of the draft appliance between the body or frame of the trailer and the body or frame of a tractor;

Fig. 2 is a plan of the same;

Fig. 3 is a diagrammatic elevation of a six wheel vehicle provided with a draft appliance in accordance with this invention, and Fig. 4 is a perspective view of a modified form of king bolt.

In the drawing, the reference numeral 1 denotes the body or frame of a trailer having a two-wheel truck 2 at one end thereof and a pivoted trestle or support 3, adjacent the opposite end of the trailer, so that the trailer body can be supported in a horizontal position, independently of a tractor, particularly when being loaded or unloaded.

At the forward end of the trailer body or frame 1 are depending side bearings 4 and mounted in said bearings is an axle 5 having the ends thereof provided with revoluble wheels 6.

The reference numeral 7 denotes a four wheel tractor or other vehicle, and the side frames of the tractor, at the rear end thereof, are connected by transverse beams 9, each of which has a set of openings 10. The front and rear sides of the beams 9 are provided with guides 11 for longitudinally disposed rods 12 that are slidable in the guides. Fixed on the rods 12, intermediate the ends thereof is a yoke 13 and encircling the rods 12, between the yoke 13 and the guides 11, are coiled compression springs 14. The expansive force of the springs 14 is adapted to hold the yoke 13 midway between the beams 9 and when said yoke is moved in either direction, the springs 14 are adapted to restore the yoke to normal position.

The beams 9 and rear frame 15 of the tractor support a track having an inclined portion, said track being composed of rails 16 made of angle plate or bars and gradually converging from the rear end of the tractor toward the forward end thereof, as best shown in Fig. 2. The rails 16 have the flanges at the outer sides thereof and said rails are connected to track plates 17 so as to coöperate therewith in providing a support on which the wheels 6 of the axle 5 may travel when the tractor 7 is attached to the trailer.

Loose in the yoke 13 is a vertical king bolt 18 held against vertical displacement by a cotter pin 19. The upper end of the king bolt 18 is provided with a C-shaped head 20 adapted to receive the axle 5, said head having the rear side thereof open so that the tractor 7 may be backed under the forward end of the trailer, until the king bolt head 20 receives the axle 5. The king bolt head 20 has the rear open side thereof tapered, as at 21 and fixed upon the axle 5 are collars 22. The head 20 is adapted to ride between the collars and engage the axle 5, thus positioning the forward end of the trailer so that the wheels 6 will travel upon the rails 16 and the track plates 17, somewhat similar to the fifth wheel of a vehicle.

After the king bolt head 20 engages the axle, a pin 23 is placed in the head, thus inclosing the axle so that said axle will be moved with the tractor. The king bolt head has an apertured lug 24 connected by a coiled spring 25 to the forward track plate 17, and this spring will hold the head 20 in position to receive the axle 5, thus preventing the king bolt from accidentally rotating to a position that would preclude the head of the king bolt receiving the axle.

The pin 23 requires manual manipulation to couple and uncouple a tractor relatively to a trailer, but in Fig. 4 there is illustrated a modified form of king bolt 26 which is provided with a C-shaped head 27 having latch members 28. The latch members 28 are pivoted relatively to the head 27 and will permit an axle to enter said head, but will prevent the head from being withdrawn from an axle by reason of said members engaging shoulders 29. Attached to one of the members however is a cable 30 which may extend to the driver's seat of the tractor 7 so that when it is desired to uncouple or move away from the trailer, the latch members 28 can be elevated to release the axle of the trailer.

I attach considerable importance to the fact that with the trailer stationary, and the forward end thereof supported by the trestle 3, the rear end of the tractor 7 may be backed under the forward end of the trailer and the forward end of the trailer elevated until the wheels 6 of the axle rest upon the horizontal portions of the rails 16. With the head 20 engaging the axle 5, the pin 23 can be placed in position and then the trailer moved just as though it were an integral part of the tractor. While the king bolt and yoke 13 are fixed relative to the axle 5, yet the rods 12 can slide in the guides 11, consequently there is a yieldable connection between the trailer and the tractor and any excessive strains or stresses are resisted by the springs encircling the rack 12.

With the inclined track of the tractor converging or having a wide rear end, it is possible to safely and correctly back into position under the forward end of the trailer, and either one of the rails 16 therefore laterally shifts the forward end of the trailer so that the axle 5 is correctly positioned to be articulated with the king bolt.

The rear ends of the rods 12 may be connected by the cross head 31 of a draw bar 32 slidable between guides 33 on the rear frame 15. This draw bar may be connected to a four wheel trailer or vehicle.

While in the drawings there are illustrated the preferred embodiments of my invention, it is to be understood that the structural elements are susceptible to such changes, in size, shape and manner of assemblage, as fall within the scope of the appended claims.

What I claim is:—

1. In a six wheel vehicle having separatable parts, an axle and wheels carried by one part, a track carried by the other part of said vehicle and adapted to be pushed under said axle and wheels, and a king bolt carried by the last mentioned parts adapted to be coupled to said axle.

2. In a six wheel vehicle having separatable parts, an axle and wheels carried by one part, a track carried by the other part of said vehicle and adapted to be pushed under said axle, a draft appliance carried by the last mentioned part, and a king bolt carried by said draft appliance and having a head adapted to receive said axle and be coupled thereto.

3. The combination of a trailer, an axle and wheels carried thereby, a tractor, a track on said tractor for the wheels of said trailer, a draft appliance on said tractor, and a bolt carried by said draft appliance and adapted to be coupled to the axle of said trailer.

4. The combination of a trailer, wheels at the forward end thereof, a tractor, a track on the rear end of said tractor for the wheels at the forward end of said trailer, a draft appliance carried by said tractor, and a king bolt carried by said draft appliance and adapted to swivel the forward end of said trailer relatively to the tractor.

5. The combination of a trailer, an axle and wheels at the forward end thereof, a tractor, a track on said tractor for the wheels at the forward end of said trailer, a draft appliance carried by said tractor, a king bolt carried by said draft appliance, a head on said king bolt adapted to receive the axle of said trailer and means adapted for holding said axle in the head of said king bolt.

6. The combination of a trailer having an axle at the forward end thereof, a tractor, a draft appliance on said tractor, a king bolt carried by said draft appliance, a head on said king bolt adapted to receive the axle of said trailer, and means adapted for holding the axle of said trailer in the head of said king bolt.

7. The combination of a trailer having an axle, a tractor, a king bolt carried thereby, a head on said king bolt adapted to receive the axle of said trailer and means adapted for holding the axle of said trailer in the head of said king bolt.

In testimony whereof I affix my signature in the presence of two witnesses.

SIDNEY B. WINN.

Witnesses:
   E. E. Mix,
   G. R. Buck.